United States Patent
Sato et al.

(10) Patent No.: US 6,423,448 B1
(45) Date of Patent: Jul. 23, 2002

(54) NON-AQUEOUS ELECTROLYTE SECONDARY BATTERY

(75) Inventors: Toshitada Sato; Yasuhiko Bito; Toshihide Murata, all of Osaka; Shuji Ito, Nara; Hiromu Matsuda, Hyogo; Yoshinori Toyoguchi, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 68 days.

(21) Appl. No.: 09/583,149

(22) Filed: May 30, 2000

Related U.S. Application Data (63) Continuation-in-part of application No. 09/080,986, filed on May 19, 1998, now abandoned.

(30) Foreign Application Priority Data

May 22, 1997 (JP) .............................. 9-132298

(51) Int. Cl.$^7$ .............................................. H01M 4/58
(52) U.S. Cl. .................. 429/218.1; 429/209; 429/231.6
(58) Field of Search .................. 429/231.6, 218.1, 429/209

(56) References Cited

FOREIGN PATENT DOCUMENTS

| FR | 2 725 709 A1 | 4/1996 | |
|----|--------------|--------|---|
| FR | 2 730 988 A1 | 8/1996 | |
| JP | 06338325 A2 | * 12/1994 | ............ H01M/4/58 |
| WO | WO9119327 | * 12/1991 | ............ H01M/4/58 |

* cited by examiner

*Primary Examiner*—Gabrielle Brouillette
*Assistant Examiner*—Angela J. Martin
(74) *Attorney, Agent, or Firm*—Akin, Gump, Strauss, Hauer & Feld, L.L.P.

(57) ABSTRACT

Disclosed is a negative electrode active material offering a long life non-aqueous electrolyte secondary battery with high energy density that shows excellent cycle life characteristics. The negative electrode active material comprises a compound represented by the formula $DSnO_3$ wherein D represents at least one selected from the group consisting of alkaline earth metals.

2 Claims, 6 Drawing Sheets

NON-AQUEOUS ELECTROLYTE SECONDARY BATTERY

CROSS-REFERENCE TO RELATED APPLICATIONS

This is a continuation-in-part application of application Ser. No. 09/080,986, filed May 19, 1998, now abandoned.

BACKGROUND OF THE INVENTION

The present invention relates to a non-aqueous electrolyte secondary battery, particularly an improvement of a negative electrode used therefor.

There have been various vigorous studies on a non-aqueous electrolyte secondary battery including lithium or a lithium compound as a negative electrode, because it is to be expected to offer a high voltage as well as a high energy density.

To date, oxides and chalcogens of transition metals like $LiMn_2O_4$, $LiCoO_2$, $LiNiO_2$, $V_2O_5$, $Cr_2O_5$, $MnO_2$, $TiS_2$, $MoS_2$ and the like are known positive electrode active materials for non-aqueous electrolyte secondary batteries. Those compounds have a layered or tunneled crystal structure that allows free intercalation and deintercalation of lithium ions. On the other hand, there are many previous studies on metallic lithium as the negative electrode active material. However, metallic lithium has a drawback that when used as the negative electrode active material, a deposition of lithium dendrites occurs on the surface of lithium during charging, which reduces charge/discharge efficiency or causes internal short-circuiting due to contact between formed lithium dendrites and the positive electrode. As one measure for solving such drawback, the use of a lithium alloy such as lithium-aluminum alloy which not only suppresses the growth of lithium dendrites but also can absorb therein and desorb therefrom lithium as the negative electrode has been under investigation. However, the use of such lithium alloy has a drawback that repeated charge/discharge operation causes pulverization of the alloy as the electrode, which in turn deteriorates the cycle life characteristics of a battery.

Therefore, there are proposals to suppress pulverization of the electrode by using a lithium-aluminum alloy including additional elements as electrode (e.g., Japanese Laid-Open Patent Publications Sho 62-119856 and Hei 4-109562). Under the circumstance, however, the improvement remains unsatisfactory. At present, lithium ion batteries have been put into practical use that include as the negative electrode a highly safe carbon material capable of reversibly absorbing and desorbing lithium and having exceptional cycle life characteristics although smaller in capacity than the above-mentioned negative electrode active materials. In an attempt to realize a higher capacity, various proposals have been made of an application of oxides to negative electrodes. For example, it is suggested in Japanese Laid-Open Patent Publications Hei 7-122274 and Hei 7-235293 that crystalline oxides such as SnO and $SnO_2$ may serve as negative electrode active materials with higher capacities than the conventional oxide $WO_2$. There is another proposal in Japanese Laid-Open Patent Publication Hei 7-288123 to use non-crystalline oxides such as $SnSiO_3$ or $SnSi_{1-x}P_xO_3$ for the negative electrode in order to improve the cycle life characteristics. But, the improvement is still unsatisfactory.

BRIEF SUMMARY OF THE INVENTION

The primary object of the present invention is to provide a negative electrode for non-aqueous electrolyte secondary batteries having excellent charge/discharge cycle life characteristics.

Another object of the present invention is to provide a negative electrode affording a high electric capacity and an exceptional cycle life by absorbing lithium upon charging without growing lithium dendrites.

The present invention provides a non-aqueous electrolyte secondary battery comprising a chargeable and dischargeable positive electrode, a non-aqueous electrolyte and a chargeable and dischargeable negative electrode, wherein the negative electrode comprises a compound represented by the formula (1)

$$DSnO_3 \qquad (1)$$

wherein D represents at least one alkaline earth metal.

In a preferred mode of the present invention, D is represented by the formula (2)

$$Sr_xBa_{1-x} \qquad (2)$$

wherein $0.03 \leq x \leq 0.5$.

It is further preferable that the range of x is $0.1 \leq x \leq 0.5$ in the formula (2)

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Upon being integrated in a battery, lithium is intercalated into the negative electrode active material in accordance with the present invention during charging in normal cases. In the formula $Li_\theta DSnO_\gamma$ representing the composition of a composite compound intercalated with lithium, the content of lithium represented by $\theta$ is preferably in a range of $1 \leq \theta < 10$. When $10 \leq \theta$, the compound can give only poor cycle life characteristics and thus not practical. On the other hand, when $\theta < 1$, the compound disadvantageously produces a small capacity. It is assumed that when such compound already intercalated with lithium is subjected to repeated intercalation and deintercalation of lithium by charge/discharge cycles, the compound loses its original composition partially. Therefore, it seems appropriate that the compound has a composition where the respective elements Li, D, Sn and 0 are present in an atomic ratio of θ:1:1:γ

According to the present invention, a highly reliable non-aqueous electrolyte secondary battery with a high energy density as well as an exceptional cycle life which is free from development of dendrite-induced short-circuiting.

In the following, the present invention will be described referring to specific examples, although the present invention is not limited thereto.

EXAMPLE 1

In the present example, compounds represented by the formula (1) were evaluated.

Figure 1:
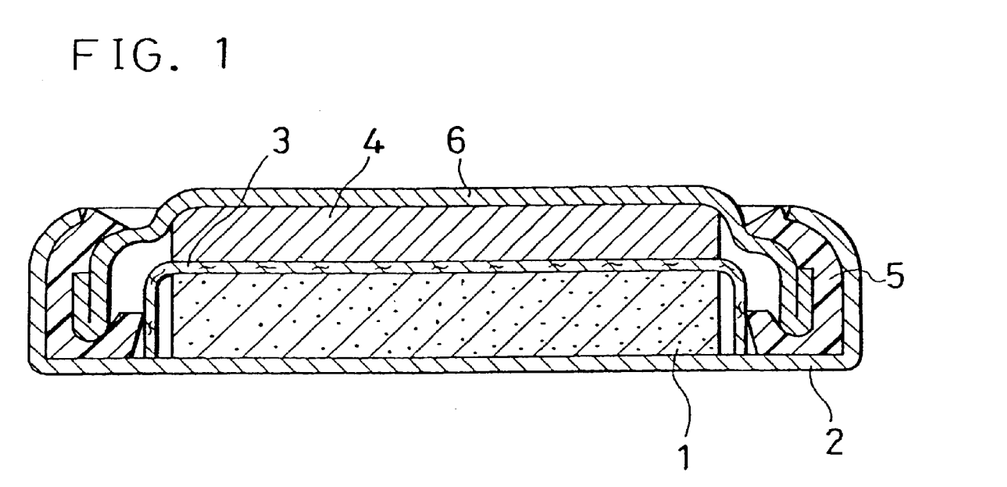
FIG. 1 is a brief longitudinal cross-sectional view of a test cell for evaluating the characteristics of an electrode of an active material in accordance with the present invention.

First, for evaluation of the electrode characteristics of those compound as negative electrode active materials, test cells as shown in FIG. 1 were fabricated.

A mixture was prepared by mixing 3 g of a graphite powder as a conductive agent and 1 g of a polyethylene powder as a binder with 6 g of each active material powder. Then, 0.1 g of the mixture was pressure-molded to a disc of 17.5 mm in diameter. An electrode 1 thus formed was placed in the center of a case 2 and disposed thereon with a separator 3 of a microporous polypropylene film.

A non-aqueous electrolyte prepared by dissolving 1 mol/l lithium perchlorate ($LiClO_4$) in a mixed solvent of ethylene carbonate and dimethoxyethane in a volumetric ratio of 1:1 was injected over the separator 3. Next, the case 2 was combined with a sealing plate 6 having a polypropylene gasket 5 on the periphery thereof and attached with a metallic lithium disc 4 of 17.5 mm in diameter to the inner surface thereof, then was sealed to complete a test cell.

Each of the test cells thus produced was subjected to cathode polarization (corresponding to charging when the active material electrode is taken as the negative electrode) at a constant current of 2 mA until the electrode potential became 0 v vs. lithium counter electrode. Then, the test cell was subjected to anode polarization (corresponding to discharging) until the electrode potential dropped to 1.5 V vs. lithium counter electrode. Cathode and anode polarizations were repeated and the electrode characteristics were evaluated in all the test cells.

For comparison, conventional oxides and sulfides of metals listed in Table 1 were used.

The present example used those oxides listed in Table 2.

The discharge capacities per gram of the active material at the 1st cycle in the test cells are summarized in Tables 1 and 2, respectively.

All of the test cells including oxides of Example 1 in accordance with the present invention were found chargeable and dischargeable. Upon completion of cathode polarization at the 10th cycle, the test cells were disassembled and found to have no deposits of metallic lithium.

The above results indicated that the electrodes including the active materials in accordance with the present invention absorb therein lithium upon cathode polarization and desorb therefrom absorbed lithium upon anode polarization without growing dendrites of metallic lithium.

Figure 2:
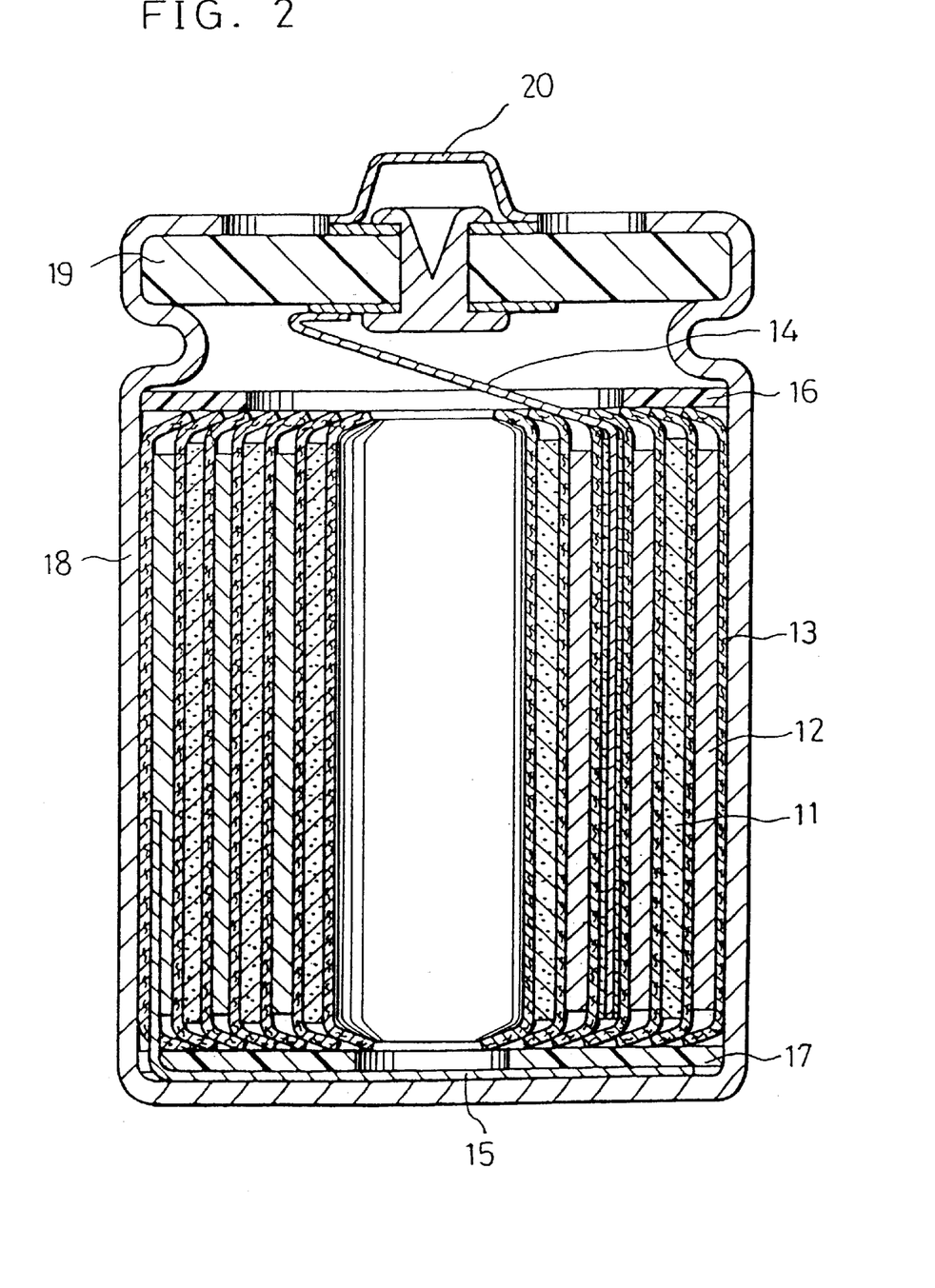
FIG. 2 is a longitudinal cross-sectional view of a cylindrical battery used for embodying the present invention.

Next, for evaluation of the cycle life characteristics of the batteries applied with the negative electrodes of the active materials in accordance with the present invention, cylindrical batteries as shown in FIG. 2 were produced.

The batteries were produced as follows:

First, a positive electrode active material $LiMn_{1.8}Co_{0.2}O_4$ was synthesized by mixing $Li_2CO_3$, $Mn_3O_4$ and $CoCO_3$ in a predetermined molar ratio, followed by heating at 900° C. The resultant was further filtered through 100 mesh or less before used as the positive electrode active material of Example 1.

Then, to 100 g of the positive electrode active material, 10 g of a carbon powder as a conductive agent, 8 g (in solids) of an aqueous dispersion of polytetrafluoroethylene as a binder and pure water were added to form a paste. The paste was applied on a titanium core material, dried and rolled. In this way, a positive electrode plate was produced.

Separately, a negative electrode plate was prepared as follows:

Each of various active materials, a graphite powder as a conductive agent and polytetrafluoroethylene as a binder were mixed in a weight ratio of 60:30:10 and the mixture was made into a paste using a petroleum solvent. The paste was applied on a copper core material, followed by drying at 100° C. to form a negative electrode plate.

A porous polypropylene film was used as the separator.

Then, a positive electrode plate 11 having a spot-welded positive electrode lead 14 made of the same material as that of the core material was combined with a negative electrode plate 12 similarly having a spot-welded negative electrode lead 15 made of the same material as that of the core material together with a band-like separator 13 of a porous polypropylene film interposed therebetween and the combination was spirally rolled up to make an electrode group. The electrode group was placed in a battery case 18 after adhering polypropylene insulating plates 16 and 17 to the top and the bottom of the electrode group. A step was formed at the upper part of the battery case 18 and a non-aqueous electrolyte prepared by dissolving 1 mol/l lithium perchlorate in a mixed solvent of ethylene carbonate and dimethoxyethane in an equivolumetric ratio was injected into the battery case 18. Then, the case was sealed using a sealing plate 19 provided with a positive terminal 20 to form a battery.

Each of the batteries thus formed was subjected to a charge/discharge cycle test under conditions of a temperature of 30° C., a charge/discharge current of 1 mA/cm² and a charge/discharge voltage in a range of 4.3 to 2.6 V.

Tables 1 and 2 summarize the discharge capacity maintenance ratios after 100 cycles in the batteries including negative electrodes of the oxides of the comparative example and Example 1, using their discharge capacities at the 2nd cycle as reference.

TABLE 1

| Comparative Example | Capacity (mAh/g) | Capacity maintenance rate (%) |
|---|---|---|
| $WO_2$ | 190 | 9 |
| $Fe_2O_3$ | 185 | 10 |
| SnO | 522 | 5 |
| $SnSiO_3$ | 453 | 20 |
| PbO | 453 | 2 |
| SnS | 498 | 6 |
| PbS | 436 | 3 |
| $SnSi_{0.8}P_{0.2}O_{3.1}$ | 406 | 25 |

TABLE 2

| Example | Capacity (mAh/g) | Capacity maintenance rate (%) |
|---|---|---|
| $MgSnO_3$ | 550 | 85 |
| $CaSnO_3$ | 570 | 90 |
| $SrSnO_3$ | 630 | 95 |
| $BaSnO_3$ | 400 | 95 |
| $Sr_{0.1}Ba_{0.9}SnO_3$ | 630 | 95 |
| $Sr_{0.3}Ba_{0.3}SnO_3$ | 620 | 95 |
| $Sr_{0.5}Ba_{0.5}SnO_3$ | 600 | 95 |

As is evident from the tables, the batteries using the negative electrodes of the oxide active materials in accordance with the present invention are improved drastically in the cycle life characteristics as compared with those using the negative electrodes of the conventional oxides.

Figure 3:
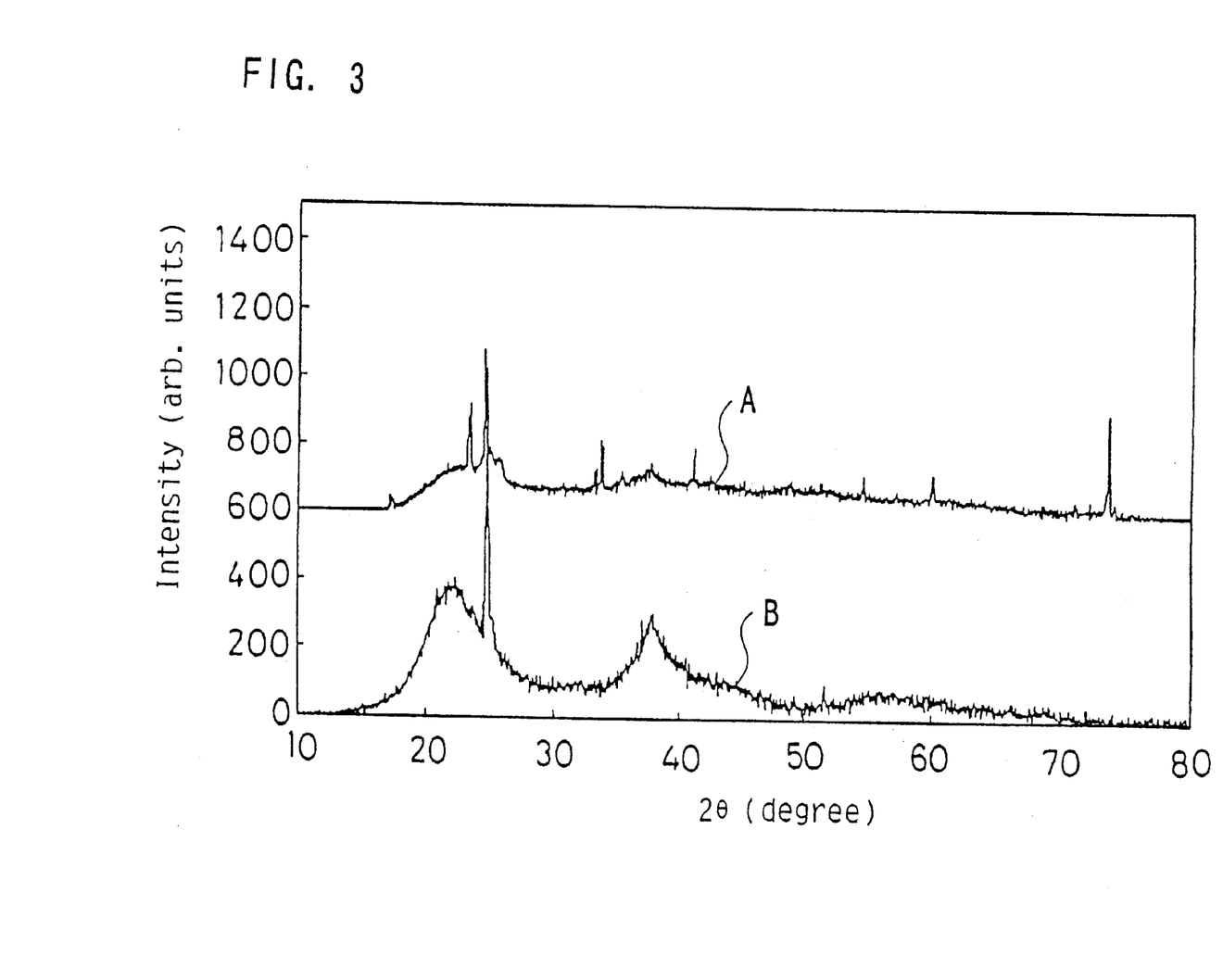
FIG. 3 is an X-ray diffraction pattern A and B obtained from a negative electrode active material of $MgSnO_3$ and $SnO_2$ respectively of a test cell upon cathode polarization at the 10th cycle.

Next, the factor contributing to the improved cycle life characteristics of the above-mentioned active materials of the present invention was analyzed. FIG. 3 shows an X-ray diffraction pattern A obtained from the test cell using $MgSnO_3$ as the negative electrode active material upon completion of cathode polarization (charged state of the negative electrode active material) at the 10th cycle. The figure also lists an X-ray diffraction B in the test cell using the comparative example active material $SnO_2$. Noting the peak around $2\theta=38°$, a sharp peak clearly indicating the presence of an Li—Sn alloy was observed in the comparative example oxide. On the other hand, a very broad peak with a low peak intensity was observed in the oxide of Example 1.

The above findings suggested that the charge/discharge reaction in the comparative example oxide $SnO_2$ develops basically by the alloying reaction between Sn and Li. In the oxide $MgSnO_3$ of Example 1, although it was speculated that this oxide also experiences the same reaction, it shows a broad peak with very low peak intensity on the X-ray diffraction pattern as compared with the comparative example. This suggests very low crystallinity of the Li—Sn alloy synthesized during charge of $MgSnO_3$ as compared with the comparative example oxide $SnO_2$. Although the details remain to be clarified more, the low crystallinity was considered to result from the prevention by the presence of the group D element Mg of a reduction of the reactive surface area or inactivation due to an aggregation of Sn. This seems to have led to improved cycle life characteristics.

Although only $MgSnO_3$ was exemplified above, the same observations were obtained from the rest of the active materials.

The compound used as the active material in the present invention is generally synthesized in the state where Li is not present. In the crystal structure of the above compound, Sn is positioned at regular intervals around the alkaline earth metal element and oxygen is positioned between Sn and Sn. Consequently, it is considered that a battery in which Sn is not liable to aggregate even after repeating charge/discharge reaction and having a long cycle life can be obtained. It is also considered that the greater the ionic diameter of the alkaline earth metal, the more effectively the aggregation of Sn can be inhibited. Further, it is considered that $BaSnO_3$ is extremely stable in repeating the charge/discharge reaction because the ionic diameter of Ba is the greatest among alkaline earth metals and also greater than that of Sn in the form of atom.

Figure 4:
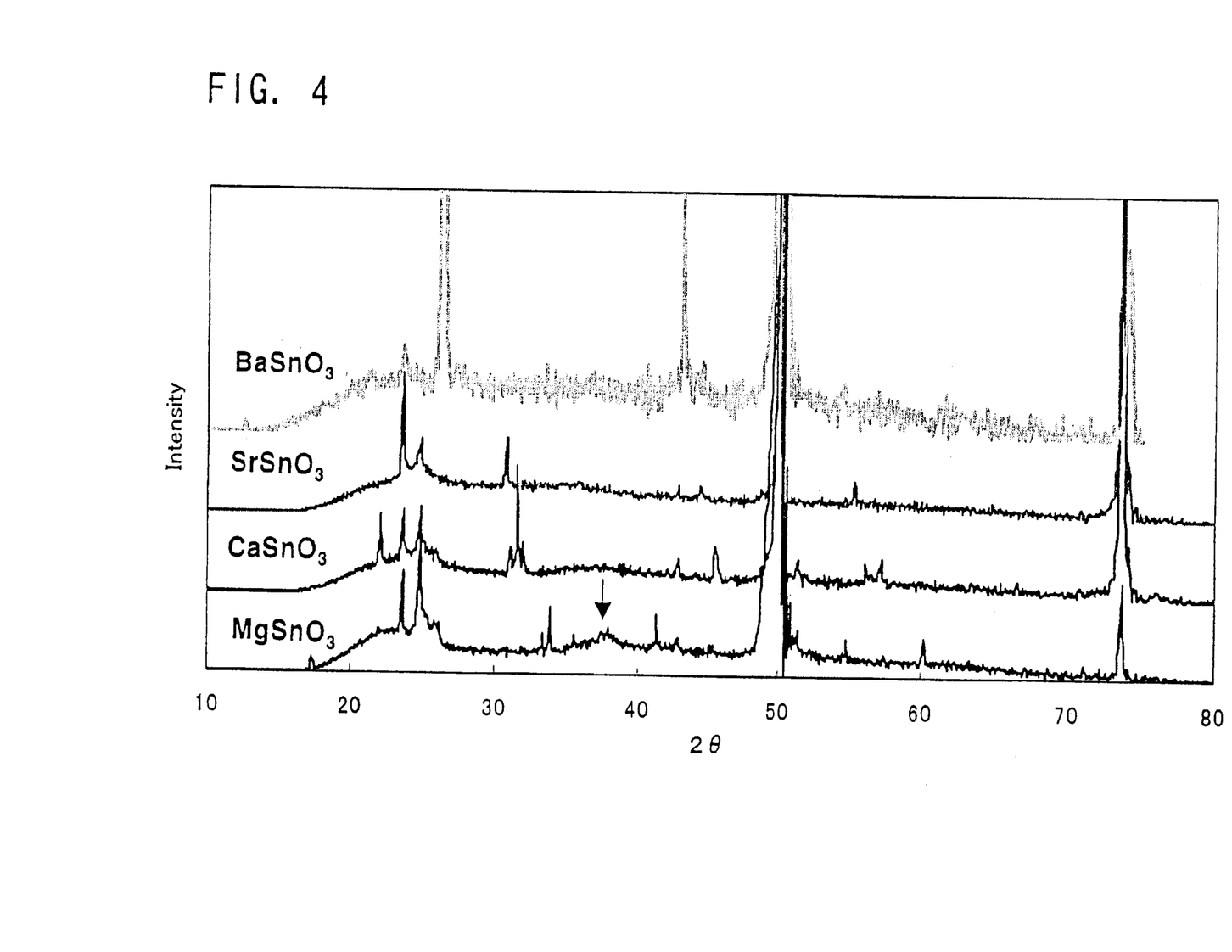
FIG. 4 is a description showing x-ray diffraction patterns of $BaSnO_3$, $SrSnO_3$, $CaSnO_3$ and $MgSnO_3$ at the first charged state.

In FIG. 4, x-ray diffraction pattern of $BaSnO_3$, $SrSnO_3$, $CaSnO_3$ and $MgSnO_3$ in the first charged state are shown. In each pattern, a peak attributed to the crystal structure of each compound is observed and $BaSnO_3$ exhibits the strongest peak. As these patterns show, each compound keeps its primary crystal structure even in the charged state. Among them, $BaSnO_3$ is considered to be the most stable.

On the other hand, Table 2 shows that $Sr_{0.1}Ba_{0.9}SnO_3$, $Sr_{0.3}Ba_{0.7}SnO_3$ and $Sr_{0.5}Ba_{0.5}SnO_3$ have peculiarly large discharge capacity. This indicates that $Sr_xBa_{1-x}SnO_3$ in the range of $0.1 \leq x \leq 0.5$ is especially excellent as the active material for the battery.

EXAMPLE 2

In this example, various lithium composite compounds were prepared by intercalating a specified amount of lithium in $MgSnO_3$ of the representative negative electrode active material of the present invention and evaluated for their electrode characteristics.

First, electrodes were produced using the above active materials, which were then integrated in test cells in the same manner as in Example 1. Then, the lithium amount capable of intercalating in each of the electrodes was estimated by regulating the quantity of electricity consumed by cathode polarization and anode polarization. After tested, the cells were disassembled for quantitation of the lithium composite compounds by ICP spectrometry. This analysis confirmed a coincidence of the composition with the estimated composition in each composite compound.

Next, for evaluation of the cycle life characteristics of the batteries applied with the negative electrodes of the various lithium composite compounds of Example 2, cylindrical batteries as used in Example 1 were produced and evaluated under the same conditions as in Example 1. At that time, the intercalated lithium amount in the negative electrode active materials was adjusted by the amount of active material used.

After evaluation, the batteries were disassembled similarly to remove the negative electrode. The lithium composite compound thus harvested was quantitated by ICP spectrometry, which confirmed the composition of each compound. The analytical results are shown in Table 3.

TABLE 3

| Lithium complex compositions | Capacity (mAh/g) | Capacity maintenance rate (%) |
|---|---|---|
| $Li_{0.1}MgSnO_3$ | 200 | 75 |
| $Li_{0.5}MgSnO_3$ | 400 | 80 |
| $LiMgSnO_3$ | 550 | 80 |
| $Li_2MgSnO_3$ | 600 | 90 |
| $Li_3MgSnO_3$ | 620 | 90 |
| $Li_4MgSnO_3$ | 650 | 95 |
| $Li_5MgSnO_3$ | 650 | 90 |
| $Li_6MgSnO_3$ | 670 | 95 |
| $Li_7MgSnO_3$ | 680 | 95 |
| $Li_8MgSnO_3$ | 670 | 90 |
| $Li_9MgSnO_3$ | 640 | 90 |
| $Li_{10}MgSnO_3$ | 580 | 85 |
| $Li_{11}MgSnO_3$ | 200 | 23 |
| $Li_{12}MgSnO_3$ | 125 | 15 |

The lithium composite compounds represented by the composition formula $Li_\theta MgSnO_3$ were found to manifest excellent electrode characteristics in a range of $1 \leq \theta < 10$. In other words, in that range, those compounds grow no metallic lithium dendrites and show good reversibility with high discharge capacity maintenance ratios.

When $10 \leq \theta$, poor cycle life characteristics were confirmed in the composite compounds. This may be because those compounds are prone to produce inactive lithium due to too much intercalation of lithium, resulting in poor cycle life characteristics. If the lithium amount is regulated to 0<θ<1, those compounds fail to produce a sufficient capacity for a battery upon operation of the battery due to small amounts of utilizable lithium.

In this example, Mg was used as the group D element included in the oxides but compounds whose D elements are selected from other alkaline earth metals can also produce similar effects.

In the foregoing examples, cylindrical batteries were used, but the present invention is not limited to such battery configuration and can exert identical inventive effects when applied to coin-shaped, angular or flat secondary batteries.

The foregoing examples used $LiMn_{1.8}Co_{0.1}O_4$ as the positive electrode, but any other positive electrode active materials including $LiMn_2O_4$, $LiCoO_2$, $LiNiO_2$ and the like which have reversible chargeability and dischargeability may be used to obtain similar effects.

EXAMPLE 3

In this example, the peculiarity of the case in which $Sr_xBa_{1-x}SnO_3$ ($0.03 \leq x \leq 0.5$) is used as the active material is studied.

Figure 5:
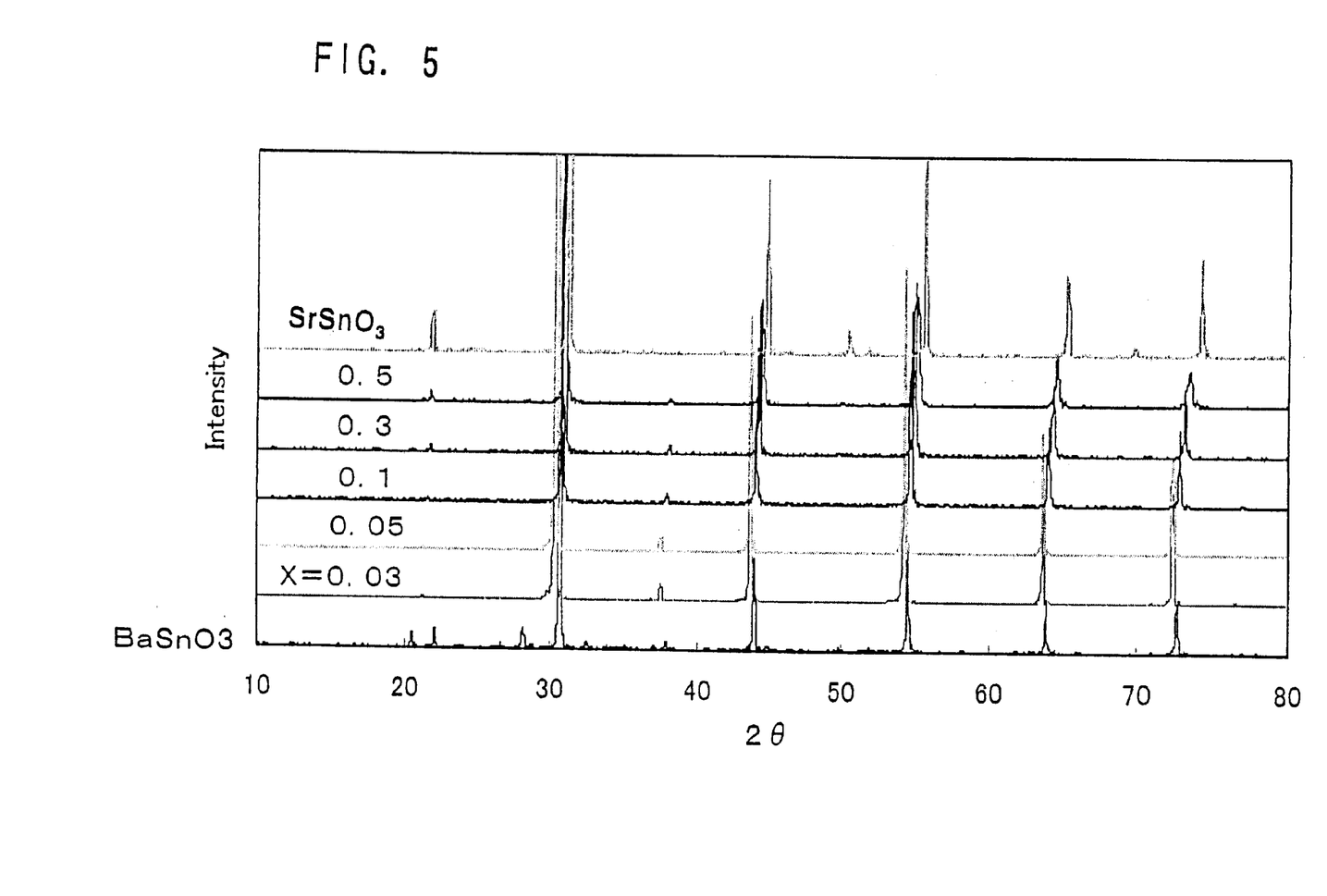
FIG. 5 is a description showing x-ray diffraction patterns of $BaSnO_3$ and $Sr_xBa_{1-x}SnO_3$.

In FIG. 5, x-ray diffraction patterns of a powder of $BaSnO_3$ and $Sr_xBa_{1-x}SnO_3$ having representative x values are shown. From these patterns, it is found that all of these compounds have the same perovskite structure. That is, Sr atoms are substituted for Ba atoms in the same place where Ba atoms were positioned.

In FIG. 5, in the range of $0.03 \leq x \leq 0.1$, the peaks are shifted to the lower angle side than the peaks of $BaSnO_3$. This suggests that the spacing of lattice planes is enlarged in this range.

Since Sr has smaller ionic diameter than Ba, it is generally estimated that the spacing of lattice planes will become smaller if some Sr atoms are substituted for some Ba atoms. In FIG. 5, however, the spacing of lattice planes is increased in the range of $0.03 \leq x \leq 0.1$, it is considered that a distortion is caused in the crystal.

Figure 6:
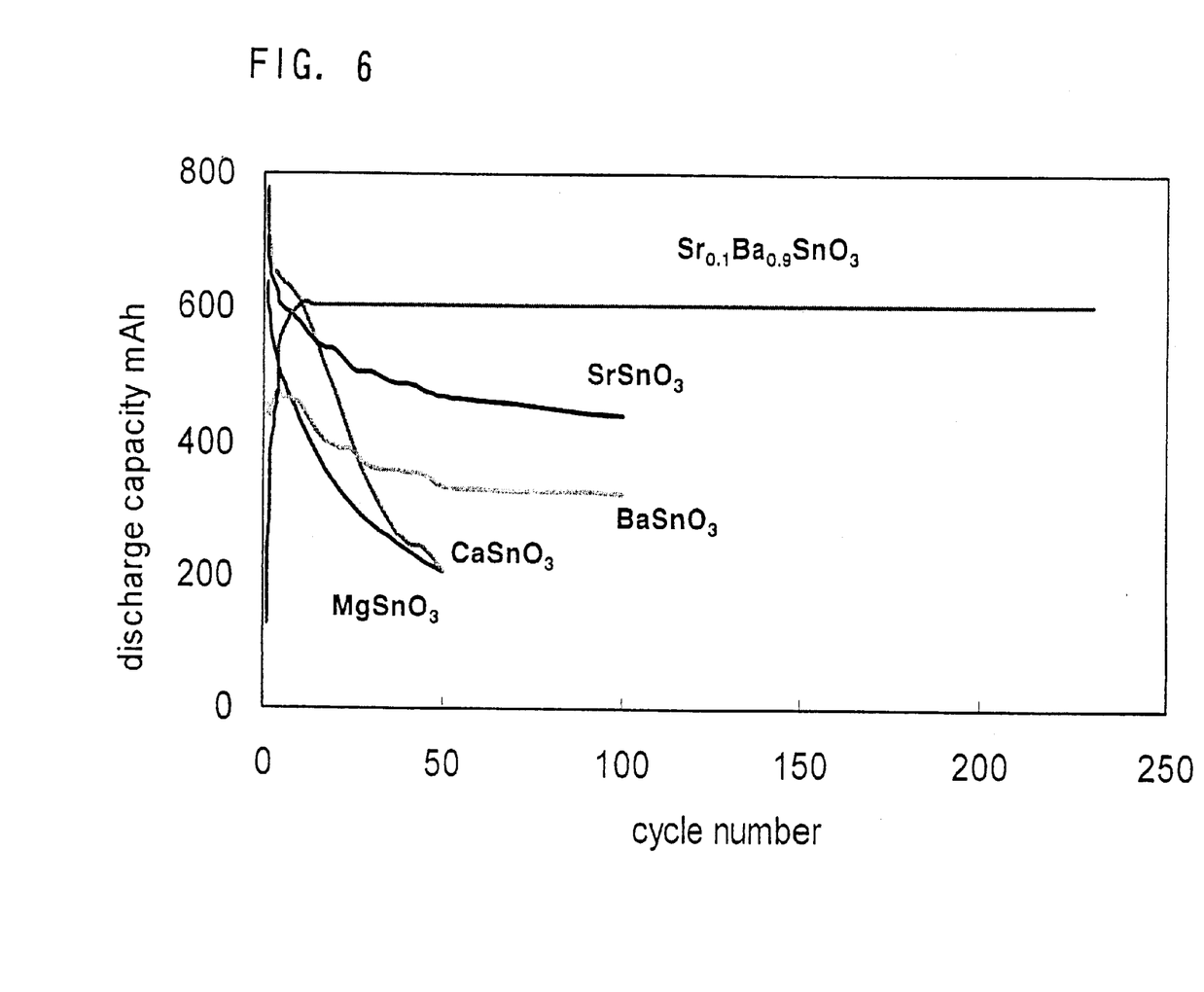
FIG. 6 is a description showing the relation between the discharge capacity and cycle number of a test cell using $BaSnO_3$, $SrSnO_3$, $CaSnO_3$, $MgSnO_3$ and $Sr_{0.1}Ba_{0.9}SnO_3$ for an active material

On the other hand, in the range of $0.03 \leq x \leq 0.1$, it is confirmed that the capacity of $Sr_xBa_{1-x}SnO_3$ increases to be twice as much as that of $BaSnO_3$. As an example, the charge/discharge cycle characteristics of $Sr_{0.1}Ba_{0.9}SnO_3$ is shown in comparison with that of $BaSnO_3$, $SrSnO_3$, $CaSnO_3$ and $MgSnO_3$. This charge/discharge cycle characteristics were measured by using the similar test cell as in Example 1 and repeating the same cathode polarization and anode polarization. FIG. 6 shows that the test cell using $Sr_{0.1}Ba_{0.9}SnO_3$ can maintain the capacity of around 90% of the initial capacity even over 200 cycles.

Further, the density of electrode mixture comprising the compound as the active material is important for the battery. That is because if the density of the electrode mixture is greater, the discharge capacity per unit volume becomes larger, thereby increasing the capacity of. the battery. Therefore, the similar electrode. mixture as in Example 1 was prepared using $BaSnO_3$ or $Sr_xBa_{1-x}SnO_3$ having a representative X value, pressed and molded the resultant to produce an electrode and measured the density of the electrode. The results are shown in Table 4.

TABLE 4

| x value | 0 | 0.03 | 0.05 | 0.1 | 0.3 | 0.5 | 1 |
|---|---|---|---|---|---|---|---|
| Compound | $BaSnO_3$ | | $Sr_xBa_{1-x}SnO_3$ | | | | $SrSnO_3$ |
| Mixture density (g/cc) | 3.2 | 3.5 | 3.5 | 3.6 | 3.2 | 3.0 | 2.4 |

Table 4 shows that the density of the electrode mixture is increased in the range of $0.03 \leq x \leq 0.1$ to obtain a battery with large capacity.

As discussed above, according to the present invention, a highly reliable non-aqueous electrode secondary battery which is free of dendrite-induced short-circuiting and affords a high energy density can be obtained by an application of a negative electrode with a high capacity and an exceptional cycle life.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A non-aqueous electrolyte secondary battery comprising a chargeable and dischargeable positive electrode, a non-aqueous electrolyte and a chargeable and dischargeable negative electrode, said negative electrode comprising a compound represented by the formula $$DSnO_3$$

wherein D is represented by the formula $$Sr_xBa_{1-x}$$

wherein $0.03 \leq x \leq 0.5$.

2. The non-aqueous electrolyte secondary battery in accordance with claim 1, wherein $0.1 \leq x \leq 0.5$.

* * * * *